United States Patent
Kursun

(10) Patent No.: US 11,321,449 B2
(45) Date of Patent: May 3, 2022

(54) SYSTEM FOR SECURITY ANALYSIS AND AUTHENTICATION ACROSS DOWNSTREAM APPLICATIONS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 576 days.

(21) Appl. No.: 16/429,665

(22) Filed: Jun. 3, 2019

(65) Prior Publication Data
US 2020/0380114 A1 Dec. 3, 2020

(51) Int. Cl.
| | |
|---|---|
| H04L 9/40 | (2022.01) |
| G06N 3/04 | (2006.01) |
| G06F 21/45 | (2013.01) |
| G06F 21/46 | (2013.01) |
| H04L 29/06 | (2006.01) |
| G06N 3/08 | (2006.01) |

(52) U.S. Cl.
CPC .............. *G06F 21/46* (2013.01); *G06N 3/08* (2013.01); *H04L 63/0838* (2013.01); *H04L 63/0861* (2013.01); *G06F 2221/2115* (2013.01); *G06N 3/0454* (2013.01)

(58) Field of Classification Search
CPC .. G06F 21/46; G06F 21/45; G06F 2221/2115; G06N 3/08; G06N 3/0454; H04L 63/0838; H04L 63/0861
See application file for complete search history.

(56) References Cited

U.S. PATENT DOCUMENTS

| | | |
|---|---|---|
| 5,721,781 A | 2/1998 | Deo et al. |
| 6,078,888 A | 6/2000 | Johnson, Jr. |
| 6,920,435 B2 | 7/2005 | Hoffman et al. |
| 6,950,810 B2 | 9/2005 | Lapsley et al. |
| 7,379,916 B1 | 5/2008 | Mizrah |
| 7,908,645 B2 | 3/2011 | Varghese et al. |
| 8,550,339 B1 | 10/2013 | Newman et al. |
| 8,635,165 B2 | 1/2014 | Beenau et al. |
| 8,819,793 B2 | 8/2014 | Gottschalk, Jr. |
| 9,619,643 B2 | 4/2017 | Dave et al. |
| 9,633,355 B2 | 4/2017 | Dave et al. |
| 9,667,611 B1 | 5/2017 | Friedman et al. |
| 9,965,523 B2 | 5/2018 | Votaw et al. |
| 11,048,809 B1* | 6/2021 | Sun .......................... H04L 63/20 |
| 2002/0010679 A1 | 1/2002 | Felsher |

(Continued)

*Primary Examiner* — Vu V Tran
(74) *Attorney, Agent, or Firm* — Moore & Van Allen PLLC; Nicholas C. Russell

(57) ABSTRACT

Embodiments of the present invention provide a system for security analysis and authentication. The system can generate a one time password (OTP) signature for a user using a neural network machine learning system. This OTP signature can be analyzed by multiple applications that each utilize different certain authentication verification matching requirements, such that security concerns and strengths of varied downstream applications are taken into account on an individual application basis. Each application determines an authentication value for the user based on the OTP signature, and access or other permissions are granted in response to the authentication value meeting or exceeding a threshold value for that application.

16 Claims, 7 Drawing Sheets

(56) References Cited

U.S. PATENT DOCUMENTS

| | | |
|---|---|---|
| 2002/0169874 A1 | 11/2002 | Batson et al. |
| 2003/0163710 A1 | 8/2003 | Ortiz et al. |
| 2007/0106517 A1 | 5/2007 | Cluff et al. |
| 2010/0158327 A1 | 6/2010 | Kangas et al. |
| 2013/0024384 A1 | 1/2013 | Beenau et al. |
| 2013/0254548 A1 | 9/2013 | Greene et al. |
| 2013/0254549 A1 | 9/2013 | Greene et al. |
| 2013/0254550 A1 | 9/2013 | Greene et al. |
| 2013/0254551 A1 | 9/2013 | Greene et al. |
| 2013/0254552 A1 | 9/2013 | Greene et al. |
| 2013/0254553 A1 | 9/2013 | Greene et al. |
| 2013/0254554 A1 | 9/2013 | Greene et al. |
| 2013/0254555 A1 | 9/2013 | Greene et al. |
| 2015/0227937 A1 | 8/2015 | Giles |
| 2016/0055487 A1 | 2/2016 | Votaw et al. |
| 2017/0109509 A1* | 4/2017 | Baghdasaryan ...... G06F 21/316 |
| 2020/0273029 A1 | 8/2020 | Kumawat et al. |

* cited by examiner

SYSTEM FOR SECURITY ANALYSIS AND AUTHENTICATION ACROSS DOWNSTREAM APPLICATIONS

BACKGROUND

Authentication systems may use a one time password mechanism to execute single use actions, multi-factor authentication actions, account control actions, and other security-related actions. However, the security consequences for a potential malfeasant actor using a one time password authentication system to gain access to of control of another's information is a significant concern to managing entities. To combat these security concerns, a more-secure one time password authentication system solution is essential to guard protected information while still permitting unrestricted use of the information by the information's owner(s) is beneficial to the managing entity. The use of complex one time password authentication systems, including one time password authentication systems that are integrated with biometric analysis, that utilize neural network machine learning systems for password identification and biometric input analysis is desired. In particular, one time password authentication systems that permit customized authentication security parameters and analysis techniques for downstream applications across an enterprise are desired.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing security analysis and authentication across downstream applications. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving one time password data associated with the user for an authentication request of a first application. Next, the system may cause a one time password signature generation engine, comprising a neural network machine learning system, to identify characteristics within the received one time password data and generate a password signature for the user based on the received one time password data associated with the user wherein the password signature comprises a collection of digital or character code associated with the identified characteristics within the received one time password data. The system can then identify a first set of authentication verification matching requirements based on the first application. The system may then determine a first user authentication value based on a comparison of the generated password signature for the user and the identified first set of authentication verification matching requirements based on the first application, and determine whether the user authentication value meets a predetermined threshold value associated with the first application. In response to determining that the user authentication value meets the predetermined threshold value associated with the first application, the system will authenticate the user. Alternatively, in response to determining that the user authentication value does not meet the predetermined threshold value associated with the first application, the system would not authenticate the user or prompt the user for additional authentication credentials.

Subsequently, the system may receive an authentication request for a second application from the user. The system can then identify a second set of authentication verification matching requirements based on the second application, wherein the second application is associated with different security parameters from the first application. In some embodiments, the system determines a second user authentication value based on a comparison of the generated password signature for the user and the identified second authentication verification matching requirements for the received second authentication request, and determines whether the second user authentication value meets a predetermined threshold value associated with the second application. In response to determining that the user authentication value meets the predetermined threshold value associated with the second application, the system can authenticate the user for the second application. Alternatively, in response to determining that the second user authentication value does not meet the predetermined threshold value associated with the second application, the system may not authenticate the user for the second application or prompt the user for additional authentication credentials.

In some embodiments, the system may additionally determine, using the first neural network machine learning system, that a set of individual capabilities of the first application or the second application are associated with malfeasance when accessed via any one time password authentication system, and restrict, disable, or delay the set of individual capabilities of the first application or the second application.

In some embodiments of the system, the second user authentication value does not meet the predetermined threshold value for the second application. In such embodiments, the system may determine that alternative characteristics of the user are required to authenticate the user for the second application, and cause a user interface of a computing device of the user to prompt the user to provide a new one time password for the user based on the alternative characteristics of the user. The system may then receive, from the computing device of the user, new one time password data associated with the user. The system can then cause the one time password signature generation engine, comprising the neural network machine learning system, to identify the new characteristics within the received new one time password data and generate a new password signature for the user based on the received new one time password data associated with the user. Next, the system may determine a third user authentication value based on a comparison of the generated new password signature for the user and the identified second authentication verification matching requirements for the received second authentication request, and determine whether the third user authentication value meets the predetermined threshold value associated with the second application. In response to determining that the third user authentication value meets the predetermined threshold value associated with the second application, the system may authenticate the user for the second application. Alternatively, in response to determining that the third user authentication value does not meet the predetermined threshold value associated with the second application, the system may not authenticate the user for the second application.

The set of authentication verification matching requirements of the system may, in some embodiments, be based on the second application comprises at least one authentication verification matching requirement associated with a characteristic that is not included in the set of authentication verification matching requirements based on the first application.

Similarly, the set of authentication verification matching requirements of the system may be based on the second application comprises at least one authentication verification matching requirement associated with a weighting value of a particular characteristic that is different from the set of authentication verification matching requirements based on the first application.

In some embodiments of the system, a second neural network machine learning system analyzes one or more of computing device information, location information, authentication activity trends for a plurality of users that includes the user, and authentication activity trends for the user to determine the first set of authentication verification matching requirements based on the first application and the second set of authentication verification matching requirements based on the second application.

Additionally or alternatively, in some embodiments of the system, a second neural network machine learning system analyzes one or more of historical one time password information, historical malfeasance information, and historical information for each of a plurality of users to determine the first set of authentication verification matching requirements based on the first application and the second set of authentication verification matching requirements based on the second application.

The one time password for the user may, in some embodiments, be determined and generated by analyzing, using a second neural network machine learning system, historical one time password information, historical malfeasance information, and historical information for each of a plurality of users to determine a set of available one time passwords, wherein the set of available one time passwords comprises one time passwords of multiple password modalities, multiple password request types, and multiple password acquisition modalities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
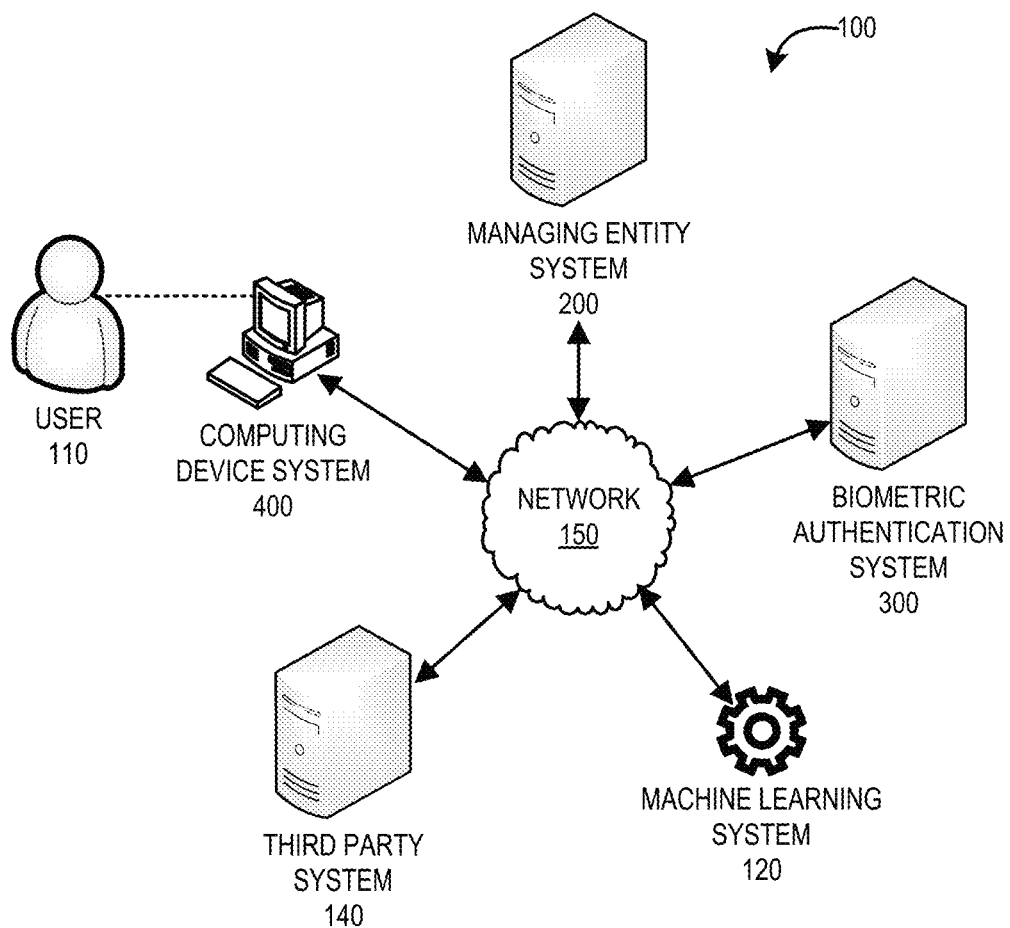
Figure 2:
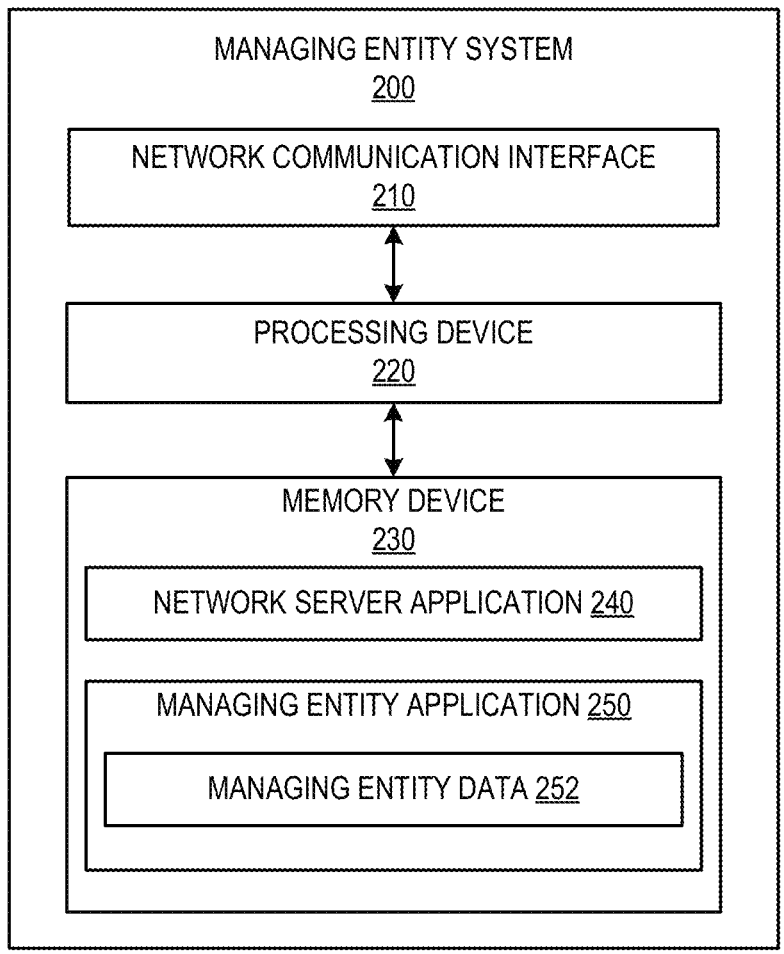
Figure 3:
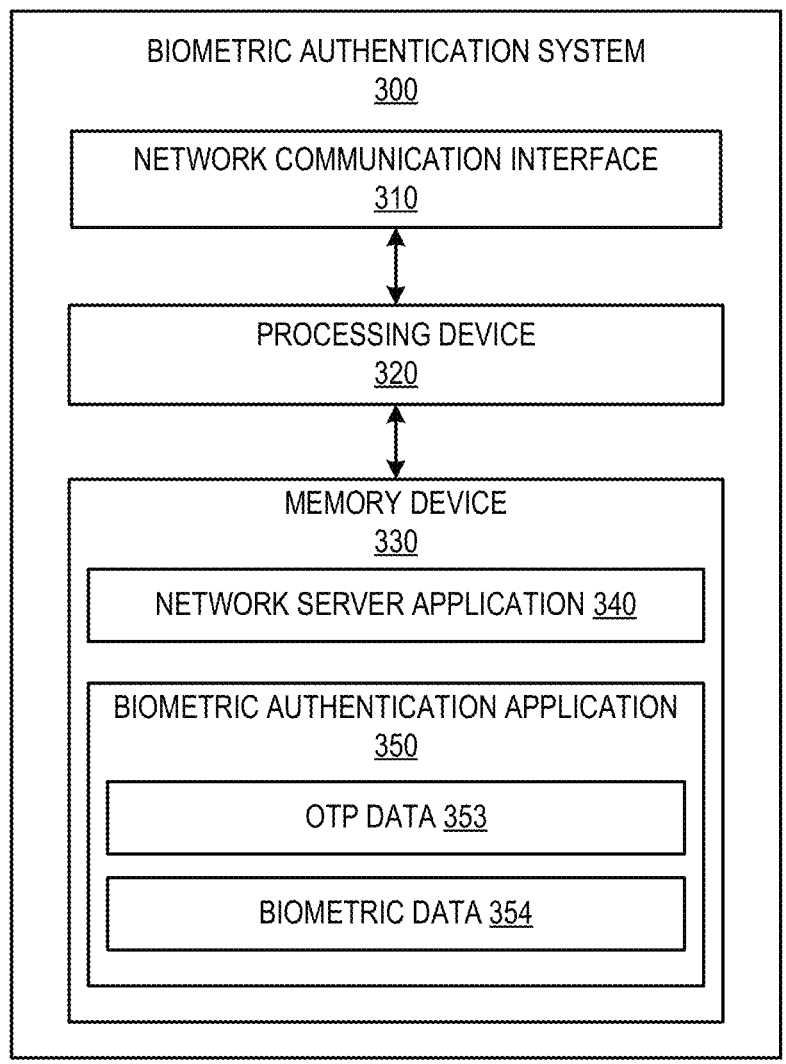
Figure 4:
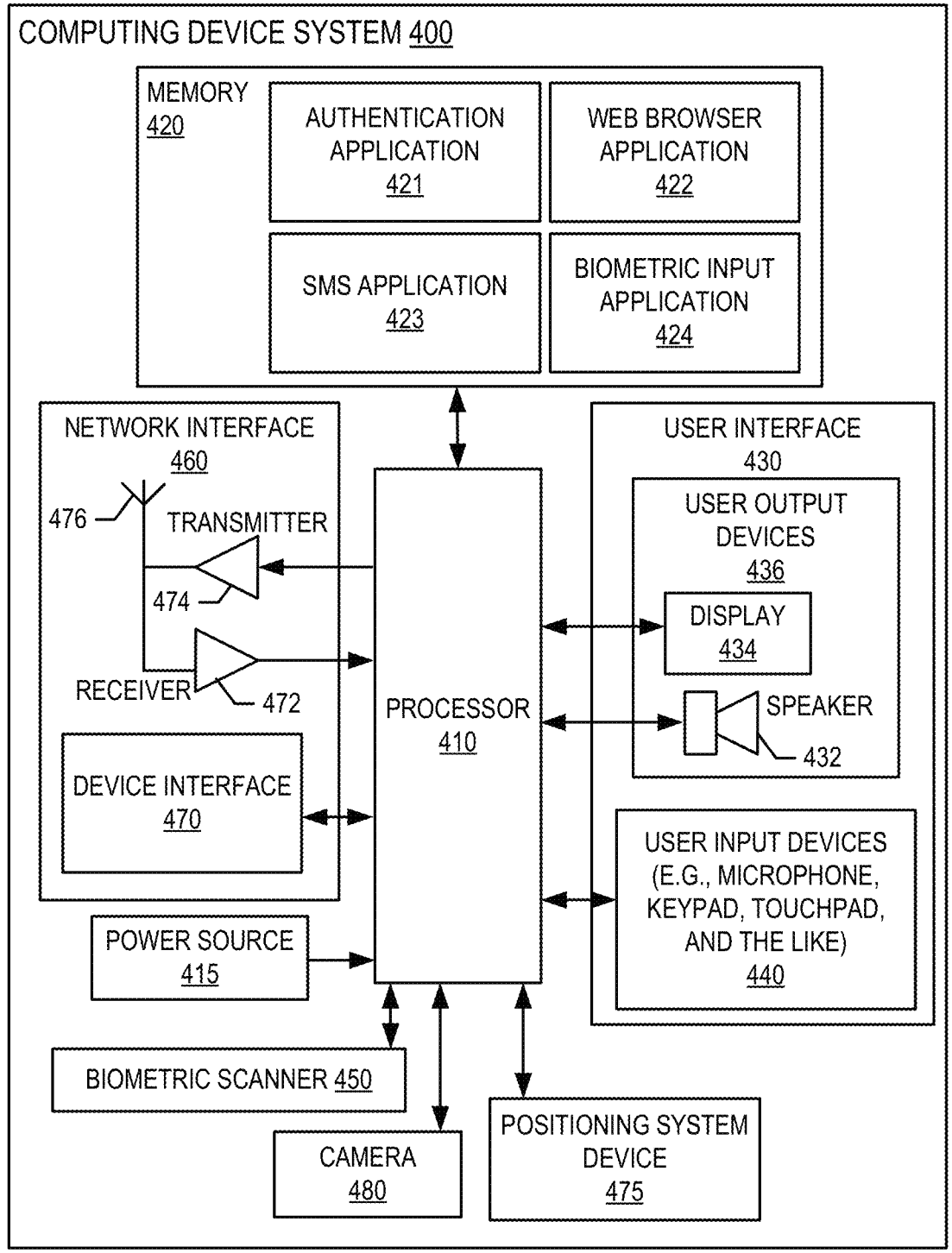
Figure 5:
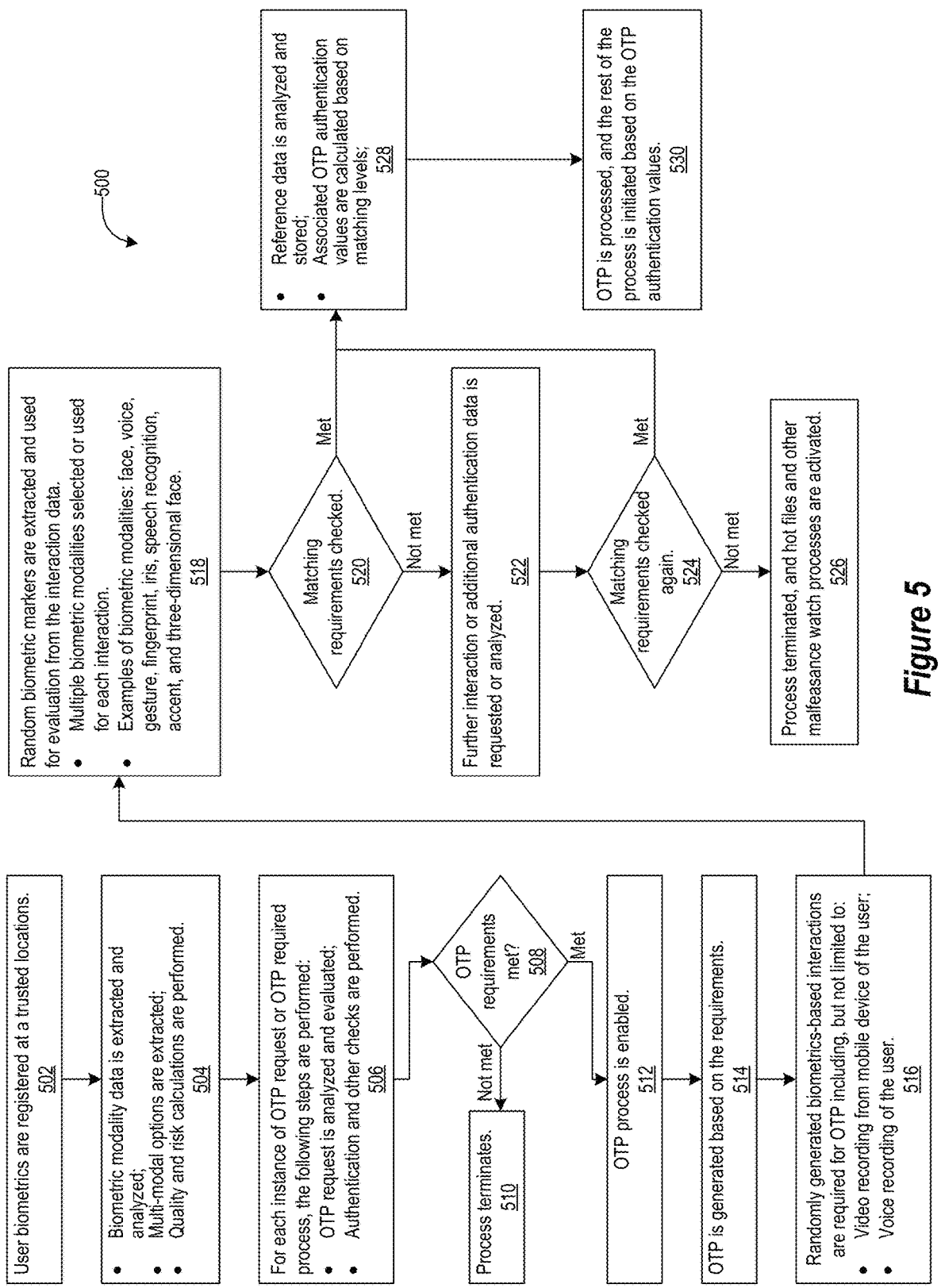
Figure 6:
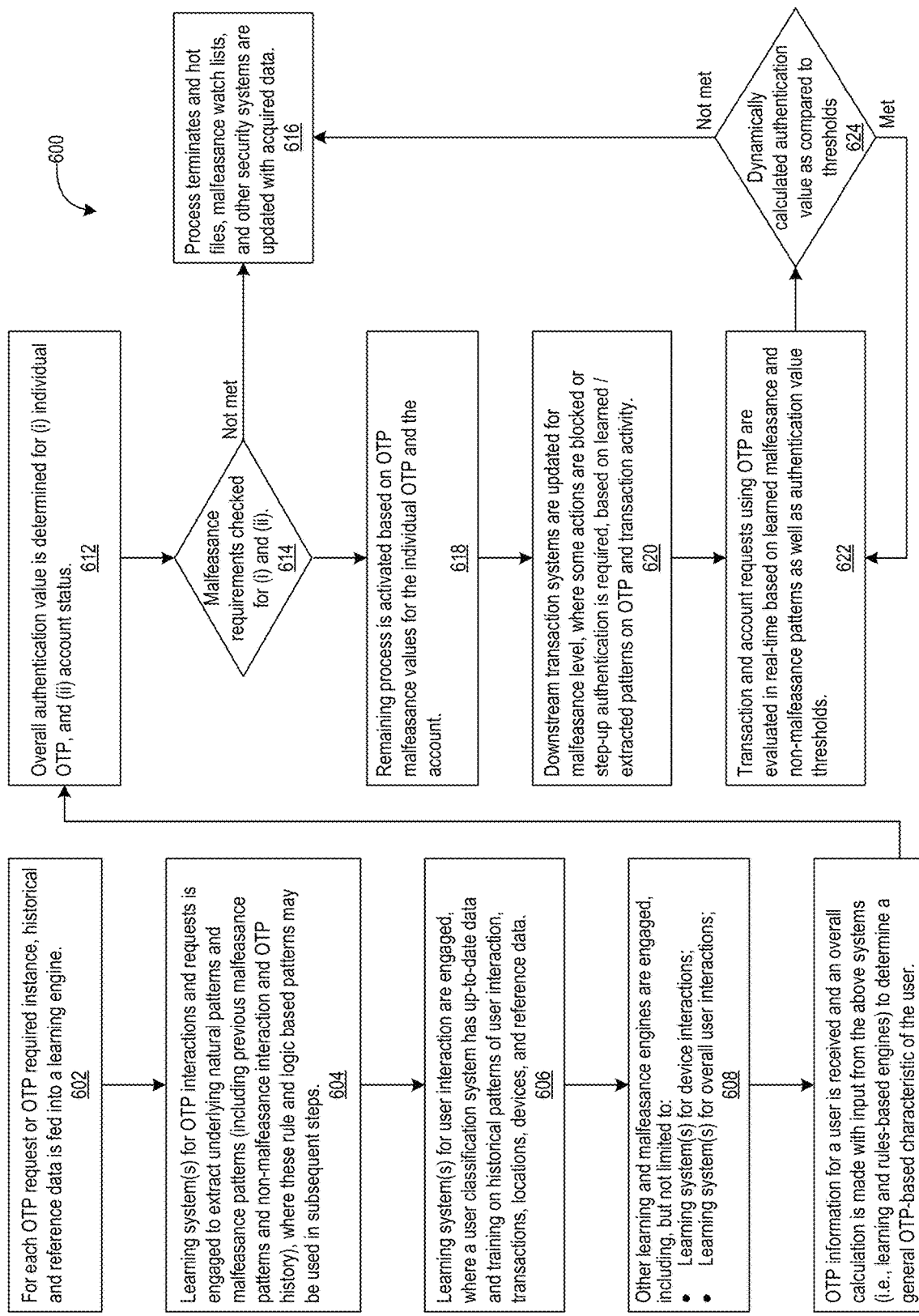
Figure 7:
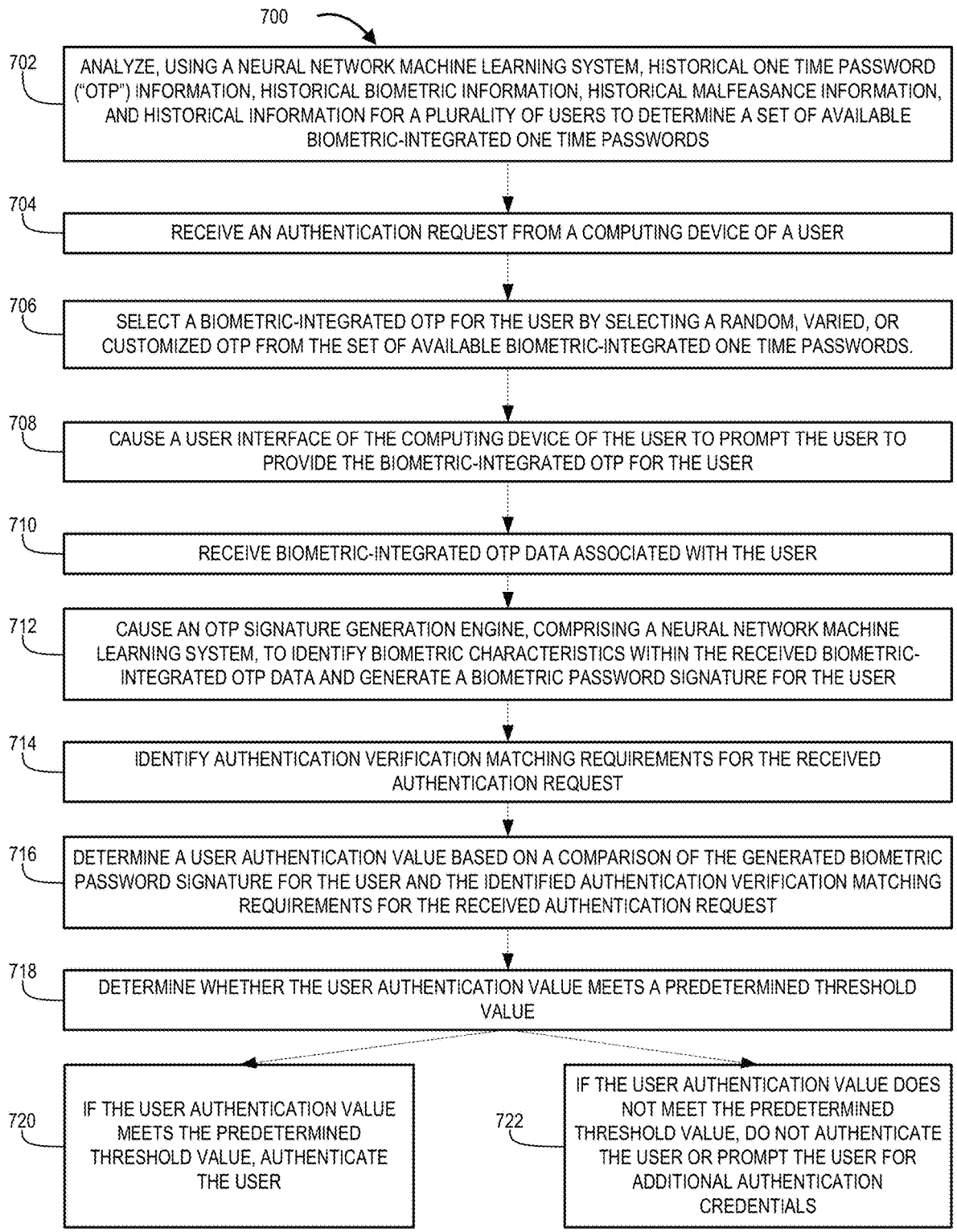

Having thus described embodiments of the invention in general terms, reference will now be made the accompanying drawings, wherein:

FIG. 1 provides a block diagram illustrating a system environment for security analysis and authentication, in accordance with an embodiment of the invention;

FIG. 2 provides a block diagram illustrating the managing entity system of FIG. 1, in accordance with an embodiment of the invention;

FIG. 3 provides a block diagram illustrating the biometric authentication system of FIG. 1, in accordance with an embodiment of the invention;

FIG. 4 provides a block diagram illustrating the computing device system of FIG. 1, in accordance with an embodiment of the invention;

FIG. 5 provides a flowchart illustrating a biometric one time password process, in accordance with an embodiment of the invention;

FIG. 6 provides a flowchart illustrating a learned risk based one time password process, in accordance with an embodiment of the invention; and FIG. 7 provides a flowchart illustrating a process for biometric-integrated security analysis and authentication, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein, "based on" means "based at least in part on" or "based at least partially on." Like numbers refer to like elements throughout.

Embodiments of the present invention provide a system and method for biometric-integrated Security Analysis and Authentication. This system is configured to protect against malfeasant actors that request a one time password ("OTP") for the purpose of signing into an account of another and taking over that account. For example, a malfeasant actor may call an entity that manages accounts of its users (e.g., customers), and the malfeasant actor may request a OTP for accessing a particular user's account to be sent to a mobile device (e.g., a device that is not known to be associated with that particular user) and taking over that user's account in an unauthorized manner (e.g., via SIM swapping). The invention described herein addresses these security concerns by providing a secure OTP solution that mitigates or prevents account takeovers and protects the information and security of a managing entity's customers. The system involves biometric-integrated OTP, where biometric information is integrated into the OTP process to provide additional and more-complex user input that can be analyzed for improved security. The system additionally utilizes machine learning systems (e.g., deep neural network systems) to determine quantifiable authentication values and/or user OTP signatures based on received OTP information and historical information. Furthermore, the system utilizes the authentication values and user characterization as part of the OTP process to provide a more secure authentication process.

The passwords of OTP systems (e.g., text, number, link, and the like) typically do not provide sufficient information about a user that is purporting to be a particular individual. By integrating biometric data into OTP systems, the managing entity is able to provide a more detailed characterization of a user and provide a more strict authentication process for the user (e.g., fewer false positive authentication results). As such, the managing entity may extract biometric information from a user, with the user's consent, from one or more trusted locations (e.g., a physical location of a managing entity, at automated teller machines associated with the managing entity, from third party biometric data providers, a computing device associated with the user, biometric OTP interactions, or the like).

As such, when an individual (i.e., a malfeasant actor) purporting to be another user initiates contact with the managing entity, claiming to have lost access to its account (but actually an account of the other user), the biometric-integrated OTP process may prevent an improper authentication. The malfeasant actor may claim to the managing entity that they do not have access to a trusted or known mobile device of the user, so they request an OTP to be sent to a different number. The OTP can be generated (e.g., randomly generated string of characters). Additionally, randomly or variedly-selected biometrics can be integrated with the OTP to prompt the individual to provide the OTP as well as the selected biometrics in order to be authenticated to access the account of the user. Because the selected biometrics were randomly, or at least variedly, selected, the malfeasant actor cannot plan, prepare, practice, or otherwise predict how to pass the biometric portion of the OTP process. The malfeasant actor is prompted to provide the OTP in a manner that is integrated with the selected biometric modality or modalities (e.g., saying the OTP, gesturing while providing the OTP, recording a video while saying the OTP, or the like). The OTP may include a pre-string that the user would always provide prior to providing the prompted OTP. The malfeasant actor likely will be unable to mimic the randomly-selected biometrics as well as provide the OTP, and therefore would not succeed in transferring the account to the mobile device of the malfeasant actor.

The biometric modalities used in the biometric-integrated OTP process may include face recognition, voice recognition, speech or accent analysis, gesture analysis, iris recognition, eye vein recognition, hand recognition, fingerprint recognition, or the like. As a user provides the biometric data as part of the OTP process, the recorded data is analyzed, and is compared to expected biometric values to determine a level of matching (e.g., an authentication value). This authentication value is determined based on historical data, account balance, known malfeasance patterns, known malfeasant biometrics, and the like.

Additionally, the system may rely on machine learning to determine potential malfeasance associated with a specific OTP request (e.g., OTP input in response to an authentication request). A neural network (e.g., deep learning) or other machine learning model (e.g., boosted decision tree, regression, or the like) or an ensemble of machine learning algorithms may be used. These machine learning systems may analyze a transaction and interaction profile of an account and/or its associated user, as well as on an overall (e.g., enterprise-wide, customer base-wide, or the like) OTP requests in the general population to identify patterns related to which OTP requests are associated with malfeasance, and patterns related to which OTP requests are not associated with malfeasance.

The machine learning systems may additionally generate a biometric-integrated OTP signature for a particular user, in response to receiving biometric OTP information as part of an authentication request and comparing that information to historical data to determine a level of match for multiple biometric characteristics of the user. This OTP signature may indicate how closely the user matches for individual or particular biometric characteristics or modalities. The system may then determine security levels for certain applications to which the user may request authentication, where the security levels may be associated with different threshold levels for accepting a biometric characteristic match than others. By generating the biometric-integrated OTP signature for the user, each application can perform its own authentication analysis against the received biometrics of the user, thereby permitting the user to receive access to as many applications of managing entity's system as will be permitted without receiving access to applications with security measures that the user has not yet met.

FIG. 1 provides a block diagram illustrating a system environment 100 for biometric-integrated security analysis and authentication, in accordance with an embodiment of the invention. As illustrated in FIG. 1, the environment 100 includes a managing entity system 200, a biometric authentication system 300, one or more computing device systems 400, a machine learning system 120, and one or more third party systems 140. One or more users 110 may be included in the system environment 100. In some embodiments, the user(s) 110 of the system environment 100 may be customers of the managing entity (e.g., a financial institution) associated with the managing entity system 200. The users 110 may additionally be malfeasant actors attempting to access information associated with customers of the managing entity.

The managing entity system 200, the biometric authentication system 300, the computing device system 400, the machine learning system 120, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the biometric authentication system 300, the computing device system 400, the machine learning system 120, and/or the third party system 140 across the network 150. For example, the managing entity system 200 may perform one or more of the process steps described with respect to FIGS. 5 through 7. Of course, the managing entity system 200 may be configured to perform (or instruct other systems to perform) one or more other process steps described herein. The managing entity system 200 is described in more detail with respect to FIG. 2.

The biometric authentication system 300 may be a system owned or controlled by the managing entity and/or a third party that specializes in identifying available biometric-integrated OTP actions, prompting computing devices to request biometric input and/or OTP input, receiving the biometric and/or OTP input, and analyzing the received information against known or stored data. In general, the biometric authentication system 300 is configured to communicate information or instructions with the managing entity system 200, the computing device system 400, the machine learning system 120, and/or the third party system 140 across the network 150. For example, the biometric authentication system 300 may be configured to perform one or more of the steps associated with biometric-integrated OTP processes described with respect to FIGS. 5 through 7. Of course, the biometric authentication system 300 may be configured to perform (or instruct other systems to perform) one or more other process steps described herein. The biometric authentication system 300 is described in more detail with respect to FIG. 3.

The computing device system 400 may be a system owned or controlled by the managing entity and/or a third party that specializes in providing computing devices, biometric scanning devices, or the like. In general, the computing device system 400 is configured to communicate information or instructions with the managing entity system 200, the biometric authentication system 300, the machine learning system 120, and/or the third party system 140 across the network 150. For example, the computing device system 400 may be configured to transmit an authentication request to the managing entity system 200 or the biometric authentication system 300, receive a prompt to provide biometric input, receive the biometric input from the user 110, and transmit the biometric input back to other portions of the system environment 100. Of course, the computing device system 400 may be configured to perform (or instruct other systems to perform) one or more other process steps described herein. The computing device system 400 is described in more detail with respect to FIG. 4.

The machine learning system 120 may comprise a network communication interface, a processing device, and one or more memory devices, where the processing devices are configured to perform certain actions with the memory devices and communicate these actions to the rest of the network 150 through the network communication interface. At least a portion of the machine learning system may be a component of the biometric authentication system 300. The machine learning system 120 may include a knowledge base (e.g., one or more databases of historical and/or current user data, historical and/or current managing entity data, historical and/or current malfeasance data, historical and/or current biometric analysis data, historical and/or current one time password OTP data, historical and/or current biometric-integrated OTP data, historical and/or current social media data, historical and/or device data, historical and/or current account data, historical and/or current transactional data, historical and/or current merchant data, or the like), a set of biometric-integrated OTP authentication analysis rules (e.g., rules based on a learning classifier system, rules based on an association rule learning system, or the like), and any other sets of data, rules, guidelines, boundaries, and any other information that can be utilized to analyze user data, authentication data, user biometric data, transaction data, OTP data, biometric-integrated OTP data, and the like as described herein.

As such, the machine learning system 120 may be a system or engine configured to receive or access historical biometric-integrated OTP information (which may include, for example, historical authentication requests, historical biometric-OTP prompts, historical responses to the historical biometric-OTP prompts, historical malfeasance data, current user data, current transaction data, current malfeasance data, current user input in response to biometric-integrated OTP prompts, and the like) from a knowledge base, the managing entity system 200, the biometric authentication system 300, the computing device system 400, and/or a third party system 140. The machine learning system 120 may additionally be configured to perform one or more of the analysis steps described herein (e.g., determine available or secure biometric-integrated OTP modalities for use in a biometric-OTP process, analyze a level of match or confidence score for a received biometric input to determine whether the biometric input matches stored, known, or expected biometric input for a particular user, or the like). The results of these analysis and determination steps may be transmitted across the network 150 to the machine learning system 200, the biometric authentication system 300, the computing device system 400, and/or the third party system 140.

This machine learning system 120 may comprise a deep learning system like a deep neural network-based system in addition to other machine learning functions like decision trees and regression techniques. In some embodiments, this deep neural network may comprise 3, 4, or more layers, and may comprise one or more of an autoencoder, a multilayer perceptron ("MLP") a recurrent neural network ("RNN"), a convolutional deep neural network ("CNN"), a Boltzmann machine, and the like.

The third party system 140 may be any system that provides data, support, or the like, to other components of the system environment 100. For example, the third party system 140 may comprise database of known biometric information, known OTP information, or the like, and the machine learning system 120 or the biometric authentication system 300 are able to access this information for analysis purposes via the network 150.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a managing entity application 250 which includes managing entity data 252, and other computer-executable instructions or other data. The computer-executable program code of the network server application 240, and/or the managing entity application 250 may instruct the processing device 220 to perform certain logic, data-processing, and data-storing functions of the managing entity system 200 described herein, as well as communication functions of the managing entity system 200.

In one embodiment, the managing entity application 250 includes managing entity data 252. The managing entity data 252 may comprise account information, user (e.g., customer) information, trusted device information, customer contact information, or the like.

The network server application 240 and the managing entity application 250 are configured to invoke or use the managing entity data 252, and the like when communicating through the network communication interface 210 with the biometric authentication application 300, the computing device system 400, the machine learning system 120, and/or the third party system 140.

FIG. 3 provides a block diagram illustrating the biometric authentication 300, in greater detail, in accordance with embodiments of the invention. As illustrated in FIG. 3, in one embodiment of the invention, the biometric authentication 300 includes one or more processing devices 320 operatively coupled to a network communication interface 310 and a memory device 330. In certain embodiments, the biometric authentication 300 is operated by a first entity, such as a financial institution, while in other embodiments, the biometric authentication 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the biometric authentication 300 described herein. For example, in one embodiment of the biometric authentication 300, the memory device 330 includes, but is not limited to, a network server application 340, a biometric authentication application 350 which includes OTP data 352 and biometric data 354, and other computer-executable instructions or other data. The computer-executable program code of the network server application 340 and/or the biometric authentication application 350 may instruct the processing device 320 to perform certain logic, data-processing, and data-storing functions of the biometric authentication 300 described herein, as well as communication functions of the biometric authentication 300.

In one embodiment, the biometric authentication application 350 includes OTP data 352 and biometric data 354. The OTP data 352 may comprise information associated with one time passwords, information for generating OTPs, historical OTPs, and the like. The biometric data 354 may include known biometric data for one or more users. For example, the biometric data 354 may comprise biometric data 354 received from trusted locations or sources. Additionally or alternatively, the biometric data 354 may comprise information associated with which biometric modalities are available for biometric-integrated OTP processes for one or more users.

The network server application 340 and the biometric authentication application 350 are configured to invoke or use the OTP data 352, the biometric data 354, and the like when communicating through the network communication interface 310 with the managing entity system 200, the computing device system 400, the machine learning system 120, and/or the third party system 140.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a biometric scanner 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400.

The biometric scanner 450 may be configured to receive biometric input from a user including, but not limited to, video, audio, facial recognition information, radar information, color information, fingerprint information, iris information, and the like.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a authentication application 421 (or any other application provided by the managing entity system 200). These applications also typically instructions to a graphical user interface (GUI) on the display 430 that allows the user 110 to interact with the computing device system 400, the managing entity system 200, and/or other devices or systems. In one embodiment of the invention, when the user 110 decides to enroll in an authentication application 421 program, the user 110 downloads, is assigned, or otherwise obtains the authentication application 421 from the managing entity system 200, or from a distinct application server (e.g., from the biometric authentication system 300). In other embodiments of the invention, the user 110 interacts with the managing entity system 200 or the resource accumulation system 400 via the web browser application 422 in addition to, or instead of, the authentication application 421.

The memory 420 of the computing device system 400 may comprise a Short Message Service (SMS) application 423 configured to send, receive, and store data, information, communications, alerts, and the like via a wireless telephone network.

The memory 420 may also include a biometric input application 424. The biometric input application 424 may be configured to cause the biometric scanner 450 to acquire biometric input from the user as part of a biometric-integrated OTP prompt or request.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates a flowchart for a biometric one time password process 500, in accordance with embodiments of the invention. The process 500 begins at block 502 where user biometrics are registered at trusted locations. These trusted locations may comprise a physical financial institution center, a secure online portal associated with an intelligent financial assistant application, a secure online portal associated with a financial specialist trained in acquiring and verifying biometric authentication information for users, secure automated teller machine terminals, and the like. Of course, the system obtains consent from the user prior to acquiring any such biometric information for subsequent use in a biometric-integrated one time password system. As described herein, the biometrics acquired by the system may comprise voice or speech information, accent information, physical gestures of a user, fingerprint information for a user, three-dimensional facial scan information, three-dimensional facial movement information, iris information, and the like.

The process 500 may then proceed to block 504, where biometric modality data is extracted and analyzed, multi-modal options are extracted, and quality and risk calculations are performed on the acquired user biometrics. The biometric modality data comprises each identifiable biometric feature of the user, combinations of associated biometric features (e.g., three-dimensional facial movement information in combination with voice information), and the like.

The multi-modal options that are extracted comprise the information associated with the types of biometric OTP requests that can be made based on the registered (or subsequently received) biometric data. In this way, the system can determine a number of possible biometric modalities to use as part of a OTP process.

The more biometric modalities that are available to the system, the more complex, robust, and therefore secure a subsequent OTP process can be in authorizing a user. This is due to the ability of a system with many biometric modalities to alternate (e.g., in a varied manner, in a random manner, or the like) between different biometric modalities and/or combine multiple biometric modalities as a component of an OTP process, thereby making it difficult for any individual other than the intended user to provide a successful response to an OTP prompt.

The quality and risk calculations performed on the registered (or subsequently acquired) biometric data, the extracted biometric modality data, and the extracted multi-modal options enable the system to determine which data points are the most useful and/or which data points should not be heavily relied upon in subsequent determinations and analyses associated with the OTP process.

Next, the process 500 may proceed to block 506 where, for each instance of an OTP request or OTP required process, the system performs the steps of analyzing and evaluating the OTP request and performing authentication and other checks on the OTP request. In general, these analysis, evaluation, and checking steps are useful in determining whether the information known for a particular user or group of users, including biometric information, biometric modality information, multi-modal options, and biometric quality information, is sufficient enough to enable a secure OTP process. The authentication and other checks performed on a received OTP request may be performed by a specialist of the managing entity trained in such checks, by an interactive voice response system, or the like, to vet the received authentication request that will require a OTP process.

The process 500 may, in some embodiments, continue to decisioning block 508, where the system determines whether the OTP requirements are met for enabling an OTP process for a user (e.g., for a particular account of the user, for all accounts of the user, or the like). Again, the system is analyzing the amount, variety, and quality of biometric information known to be associated with the user (i.e., registered or subsequently provided via a secure process) to determine whether the user of a biometric-integrated OTP process is more-secure than other account restoration processes.

If the system determines that the OTP requirements are not met, the process 500 terminates, as shown at block 510. This termination of the process 500 ensures that the system does not enable a biometric-integrated OTP process with biometric data of a user that is not adequate or of low-quality, as that information may be compromised, easily imitated, or not adequate to match with future biometric information provided by the user during a biometric-integrated OTP process.

However, if the system determines at block 508 that the OTP process requirements have been met, the process 500 proceeds to block 512, where the system enables the OTP process. Enabling the OTP process may include transmitting a notification to the computing device of the user to alert the user to the availability of the biometric-integrated OTP process.

The process 500 may additionally include block 514, where the biometric-integrated OTP is generated based on certain requirements of an authentication request. A type (e.g., level of authentication credentials required, or the like) of biometric-integrated OTP process can be determined based on information about what the authentication is for (e.g., resetting a password for an account of a user, for transferring ownership of an account to a new owner, registering a new device to have access permissions for an account of a user, or the like).

As shown at block 516, the system can require randomly generated biometrics-based interactions for the OTP process that include, but are not limited to, video recorded from a mobile device of a user, and/or a voice recording of the user. As such, the system may require that a computing device that a user seeking authentication is using has the capability to acquire all, or at least a portion of the multiple biometric modalities that are associated with that user's biometric-integrated OTP process. For example, if a user is requesting authentication via the biometric-integrated OTP process (e.g., to change a password for an account of the user), but the system determines that the computing device from which the user's request has been sent does not have the capability of scanning a fingerprint, recording video of the user, or providing a location of the computing device (and therefore the user), then the system may determine that the biometric-integrated OTP process should not be used in this instance. Alternatively, the system can prompt the user to access a second device that does have such biometric data acquisition capabilities.

The process 500 may then proceed to block 518, where biometric data is acquired from the user (e.g., via the computing device of the user, via an ATM or electronic teller associated with a managing entity of the process 500, or the like), and random (or variedly-selected) biometric markers are extracted from the acquired biometric data and used for evaluation from the interaction data provided by the user. As further stated in block 518, multiple biometric modalities can be selected or used for each interaction with the user, and examples of the biometric modalities for interaction with the user comprise a facial scan, voice recording, gesture recording, fingerprint scan, iris scan, speech recognition recording, accent recording, and/or three dimensional facial capture (including expression capture). By selecting and using multiple, varied or random biometric modalities for each interaction with a user, the system mitigates concerns with malfeasant actors detecting a pattern or finite set of information that the OTP process needs to authenticate a user, making it very difficult for a malfeasant actor to prepare for and/or imitate all of the biometric interactions required for the biometric portion of the biometric-integrated OTP process.

As shown at the decisioning block 520, the process 500 may then check the matching requirements between the biometric markers extracted from the biometric information provided by the user as part of the interaction data and the authentication requirements associated with the authentication request for which this biometric-integrated OTP process is being performed. For example, each biometric-integrated OTP process may be associated with a particular level of biometric input complexity, such that the more secure authentication levels (e.g., changing a password for an account) require a higher degree of match (or narrower margin of error) of biometric markers than less secure authentication levels (e.g., registering a new device). Additionally or alternatively, the system may determine, based on neural network machine learning systems that have parsed historical OTP data, that a particular type of authentication request has recently been associated with unauthorized access based on a first biometric modality (e.g., iris scanning), and therefore will either not use that first biometric modality as part of the OTP process or will give very little weight to matching biometric markers for the first biometric modality and instead give greater weight to other non-compromised biometric modalities. Additional examples of this type of selective biometric modality analysis are described with respect to the process 600 of FIG. 6.

In some embodiments, the step of checking matching requirements may comprise determining a biometric password signature for the user and comparing that biometric password signature against the known or identified biometric matching requirements. The biometric signature may comprise a collection of digital or character code, which can be parsed by customized authentication processes associated with applications for which an authentication request has been made to determine whether the user is authorized to access those applications.

If the system determines that the matching requirements do not meet a predetermined threshold, then the process 500 may proceed to block 522, where the system prompts the user for further interaction or to provide additional authentication which can subsequently be analyzed. For example, the system may determine that the biometric password signature of the user is close to being a match (e.g., within a secondary threshold or deviation from a sufficient match), and therefore may request additional biometric information (e.g., scans, video recording, audio recordings, or the like). These additional authentication data requests may comprise the same biometric modalities and/or different biometric modalities as the original request.

Once the additional interaction and/or authentication data has been requested, received, and analyzed, the system may again check the matching requirements, as shown at block 524. If the biometric information for the user (e.g., the biometric markers, the biometric password signature, or the like) continues to not meet the matching requirements set by the OTP process, then the system may proceed to block 526 where the process 500 is terminated, and hot files and other malfeasance watch processes are activated.

However, if the biometric information for the user (e.g., the biometric markers, the biometric password signature for the user, or the like) does meet the matching requirements at decision blocks 520 or 524, then the process 500 may proceed to block 528, where reference data is analyzed and stored, and associated OTP authentication values are calculated based on matching levels. For example, the system may determine the degree to which a biometric password signature for the user, which is based on the biometric markers extracted from OTP interaction data, meets each of a varied set of authentication metrics (e.g., authentication metrics associated with different actions, permissions, or the like for a user's account), where each of the authentication metrics may have its own process for determining whether the provided OTP biometric information is sufficient to permit the user to fully perform its respective actions or receive its respective permissions. As such, the system can determine which applications associated with the user's account are now fully open to the user, are restricted for the user, or are blocked from the user.

The process 500 may then proceed to block 530, where once the OTP is processed for each application of the account of the user, the rest of the processes of the account are initiated (including being fully open, being restricted, or being blocked) based on those OTP authentication values that were determined based on the extracted biometric markers and the OTP password signature for the user.

FIG. 6 illustrates a flowchart for a learned risk-based one time password process 600, in accordance with embodiments of the invention. The process 600 may begin with block 602 where, for each OTP request or OTP required instance (e.g., OTP authentication request, OTP analysis based on historical information, machine learning analysis of hypothetical, typical, or expected OTP requests, or the like), historical and reference data is fed into a learning engine. The learning engine may comprise a machine learning system like the machine learning system 120 described with respect to FIG. 1 (e.g., a deep neural network machine learning system).

The system may provide a knowledge base to the learning engine, where the knowledge base may include or comprise historical and reference information, data, previous biometric-OTP process determinations, previous biometric-OTP process outcomes, previous transactions, previous authentication processes, previous instances of authentication attempts associated with malfeasance, and the like. This historical data (including the most-recent data) is useful to the learning engine, as the learning engine can analyze the historical data to identify trends in the data, project future trends based on the historical data, identify potential malfeasance attempts, and the like.

The process 600 may then proceed to block 604, where one or more learning systems for OTP interactions and requests within the learning engine is engaged (including previous malfeasance patterns and non-malfeasance interaction and OTP history), and where these rule and logic based patterns may be used in subsequent steps. In this way, the learning systems of the learning engine are configured to identify normal or natural patterns of biometric-integrated OTP processes, which represent the common, everyday authentication processes that are not associated with malfeasance. The patterns can be associated with the frequency of authentication requests, the authentication types, the information or applications associated with authentication requests, the devices and/or device types used to perform the authentication request and biometric-integrated OTP processes, the locations from which legitimate authentication and associated biometric-integrated OTP processes are performed, and the like.

Additionally, the learning engine can perform similar analysis of the authentication requests and associated biometric-integrated OTP processes that have been determined to be associated with potential or known malfeasance. The same types of patterns may be determined for the malfeasance-associated requests and biometric-integrated OTP processes. As noted above, these patterns may be backward-looking as well as forward-looking, such that the learning engine may predict that the same trend will continue in the future, and therefore a future authentication request and/or associated biometric-integrated OTP process that aligns with the predicted pattern or trend can be identified as potentially being associated with malfeasance. The learning engine may store these natural and malfeasance patterns in an easily-accessible database for future reference, for future analysis, and the like.

The learning systems described in the process 600 may then perform one or more additional detailed classification, association, pairing, correlation, and other analysis steps on the knowledge base of authentication and biometric-integrated OTP-based data, as described herein. As such, the process 600 may proceed to block 606, where one or more learning systems for user interaction are engaged, where a user classification system has up-to-date data and training on historical patterns of user interaction, transactions, locations, devices, and reference data. The classification system may comprise one or more learning systems, including deep neural network systems, that are configured to analyze and parse through large amounts of data and information to make these classification determinations for each of a plurality of individual users (e.g., customers of a managing entity system for the process 600). These user classifications describe can be used to inform machine learning systems as to whether received information that is purported to be associated with a particular user (e.g., device(s) used, location, interaction metrics or information, or the like) matches with what would be expected of that user.

Additionally, the process 600 may include block 608, where other learning and malfeasance engines are engaged, including, but not limited to, certain learning systems for device interactions and learning systems for overall client interactions. The information analyzed for device interactions may comprise device types, interactions with a particular device, user input methods for a particular device or type of device, applications associated with particular devices or device types, time of usage information, frequency of usage information, device location information, device language information, device owner information, and the like. The information analyzed for overall user interactions may comprise modes of communication for the user, device information for the user, associated users of a particular user (e.g., users with a familial, social, business, transactional, or other relationship with the particular user), or the like.

With the plethora of analyzed data points, detected and predicted trends, correlated data relationships, and the like that have been compiled by the learning systems, the process 600 may continue to block 610, where OTP information (which may include biometric-integrated OTP information) for a particular user is received or extracted as part of the OTP request, and an overall calculation is made with input from each of the above-noted systems (i.e., learning systems and rules-based engines) to determine a general OTP-based characteristic of the users. The information about the received OTP information for the user is then compared, using one or more machine learning systems configured specifically for matching or analyzing received OTP input against stored and pre-analyzed data associated with the user.

The process 600 may then proceed to block 614, where the machine learning system(s) calculate an overall authentication value for (i) the individual OTP (i.e., the received OTP information for the user), and (ii) the status of an account associated with the user. The overall authentication value is a quantification of the correlation (or lack thereof) between the received OTP information (e.g., user biometric information, password information, transmitting computing device information, location information, account information, application information, and the like) and the stored, known, or pre-analyzed OTP information associated with the user.

In some embodiments, the system may generate an OTP signature (e.g., a biometric-integrated OTP signature) for the user, based on the degree of correlation between the received OTP information and the known or expected OTP information for the user. This signature can be stored and compared against a standard for a particular application. Because individual applications (e.g., account viewing applications, account transaction applications, account messaging applications, account profile applications, and the like) may be associated with varying degrees of security concerns, each individual application may have different authentication standards from one another. As such, the system may determine which application the authentication is being requested for and identify the malfeasance requirements (e.g., metrics, weightings, and the like) for that application. These malfeasance requirements are then compared against the OTP signature for a user to quantify the authentication value for that particular application. Again, as the applications may differ in their malfeasance requirements, the quantified authentication value for the user may also vary depending on which types of correlation information are given greater or lesser weight by the application for which the user's authentication is being checked.

Once the overall authentication value for the user is determined for a particular application, the system may proceed to block 614, where the system checks the malfeasance requirements for the particular application to determine whether the overall authentication value meets or exceeds a predetermined (e.g., pre-set, pre-calculated by a machine learning system) threshold value. If the predetermined threshold value is not met, the authentication request is deemed to have failed, and the interaction may be associated with potential malfeasance. In such embodiments, the system proceeds to block 616, where the process 600 terminates and hot files, malfeasance watch lists, and other security systems and processes are updated with the acquired data, the reasons for rejecting the authentication request, and the like.

Alternatively, if the authentication value is determined to meet or exceed the predetermined threshold for the malfeasance requirements, then the process 600 may proceed to block 618, where the remaining process is activated (e.g., permissioned) based on the OTP authentication values for the individual OTP and the account. For example, the system may identify one or more additional applications with the same malfeasance requirements (e.g., security profile) and automatically authenticate the user to access or use those applications in response to determining that the threshold has been met.

However, as described above, one or more other applications may have stricter malfeasance requirements (e.g., require a closer match between the user-provided OTP information and the historical or predicted OTP information). As such, the process 600 may include block 620, where downstream systems are updated for the malfeasance level, where some actions are blocked or step-up authentication is required, based on learned/extracted patterns on OTP and transaction activity. For example, the system may prevent the user from accessing an application with stricter malfeasance requirements than the application for which the user has already been authenticated, at least until the user provides additional or stepped-up authentication credentials, a more strict biometric-integrated OTP input, or the like. In this way, the system can control the security exposure for each individual application or resource of an overall system based on this OTP process.

The process 600 may include real-time or dynamic analysis of the user, the current authentication or OTP trends, the user's interaction with the authenticated application, and the like to determine whether a change has occurred that would lead to the user's OTP signature no longer meeting the predetermined threshold. As such, the process may include block 622, where transaction and account requests using OTP are evaluated in real-time based on learned malfeasance and non-malfeasance patterns as well as authentication value thresholds, and, at decisioning block 624, the system dynamically calculates the authentication value and compares them to the predetermined thresholds in real time. As long as the authentication values continue to meet the predetermined thresholds, the system continues its process 600 at block 622. However, if the system, at block 624, determines that the calculated authentication value no longer meets its respective predetermined threshold for an application, then the process moves to block 616 where the system terminates the process 600 and hot files, watch lists, and other security systems are updated with the acquired data.

Referring now to FIG. 7, a flowchart is provided to illustrate one embodiment of a process 700 for biometric-integrated security analysis and authentication, in accordance with embodiments of the invention. In some embodiments, the process 700 may include block 702, where the system analyzes, using a neural network machine learning system, historical one time password ("OTP") information, historical biometric information, historical malfeasance information, and historical information for a plurality of users to determine a set of available biometric-integrated one time passwords. In some more specific embodiments, this block 702 may comprise analyzing, using a first neural network machine learning system, historical one time password information, historical biometric information, historical malfeasance information, and historical information for each of a plurality of users to determine a set of available biometric-integrated one time passwords, where the set of available biometric-integrated one time passwords comprises biometric-integrated one time passwords of multiple biometric modalities, multiple password types, and multiple biometric and password acquisition modalities.

The first neural network machine learning system may further base its analysis on computing device information (e.g., information about the computing device of the user or another computing device that is transmitting an authentication request, authentication credentials, historical or previous computing device information associated with the user, or the like), location information (e.g., a location from which the authentication request is made, locations known to be associated with one or more users, locations known to be associated with malfeasance or potential malfeasance, or the like), authentication activity trends for the plurality of users, and authentication activity trends for a particular individual users of the plurality of users.

In some embodiments, the process 700 includes block 704, where the system receives an authentication request from a computing device of a user. This user may be one of (e.g., a "first user," a "requesting user," or the like) of the above-mentioned plurality of users (i.e., the set of users associated with a managing entity, associated with the biometric-integrated one time password system, or the like).

Additionally, in some embodiments, the process 700 includes block 706, where the system selects a biometric-integrated OTP for the user by selecting a random, varied, or customized OTP from the set of available biometric-integrated one time passwords. In some embodiments, this block 706 may more specifically comprise selecting a biometric-integrated one time password for the user from the set of available biometric-integrated one time passwords, where selecting the biometric-integrated one time password for the user comprises identifying a random, varied, or customized available biometric-integrated one time password from the set of available one time passwords, and designating it (i.e., the selected biometric-integrated one time password) as the biometric-integrated one time password for the user.

The process 700 may also include block 708, where the system causes a user interface of the computing device of the user to prompt the user to provide the biometric-integrated OTP for the user.

Prompting a user to provide the biometric-integrated one time password may comprise causing a user input device of the use interface of the computing device of the user to record a biometric sample from the user as at least a portion of the biometric-integrated one time password for the user.

Similarly, in some embodiments, the step of prompting the user to provide the biometric-integrated one time password for the user further comprises at least one of prompting the user to provide a recorded video file of a gesture of a one time password response, a recorded video and audio file of a spoken input as the one time password response, a recorded audio file of the spoken input as the one time password response, and a scanned biometric characteristic of the user as the one time password response.

In some embodiments, the process 700 includes block 710, where the system receives biometric-integrated OTP data associated with the user. The system may receive the biometric-integrated OTP data associated with the user from the computing device of the user.

Additionally, in some embodiments, the process 700 includes block 712, where the system causes an OTP signature generation engine, comprising a neural network machine learning system, to identify biometric characteristics within the received biometric integrated OTP data and generate a biometric password signature for the user. This biometric password signature for the user may be generated based on the received biometric-integrated one time password data associated with the user.

In some embodiments, the second neural network machine learning system may analyze computing device information, location information, authentication activity trends for the plurality of users, and/or authentication activity trends for this particular user to identify the biometric characteristics within the received biometric-integrated one time password data to generate the biometric password signature for the user.

The process 700 may include block 714, where the system identifies authentication verification matching requirements for the received authentication request. Furthermore, the process 700 may include block 716, where the system determines a user authentication value based on a comparison of the generated biometric password signature for the user and the identified authentication verification matching requirements for the received authentication request.

The process 700 may then continue to a decisioning block 718, where the system determines whether the user authentication value meets a predetermined threshold value. As shown at block 720, if the user authentication value meets the predetermined threshold value, the system may authenticate the user. Alternatively, as shown at block 722, if the user authentication value does not meet the predetermined threshold value, then the system does not authenticate the user or may prompt the user for additional authentication credentials.

After the system executes block 722, the system may additionally determine that the same biometric password signature for the user is generated in response to a subsequent authentication request. In such embodiments, the system may automatically restrict or block the subsequent request.

In other embodiments after the system has executed block 722, the system may identify an individual that is an owner of an account associated with the authentication request. The system may then restrict at least one of an access level to the account, an allowed transaction frequency for the account, an allowed individual transaction amount for the account, and an authentication level required to perform an action associated with the account, until an authentication of the individual that is the owner of the account associated with the authentication request is received.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/429,659 | SYSTEM FOR SECURITY ANALYSIS AND AUTHENTICATION | Jun. 3, 2019 |

The invention claimed is:

1. A system for security analysis and authentication across downstream applications, the system comprising: a controller comprising one or more memory devices with computer-readable program code stored thereon, one or more communication devices connected to a network, and one or more processing devices, wherein the one or more processing devices execute the computer-readable program code to:
receive one time password data associated with a user for an authentication request of a first application;
cause a one time password signature generation engine, comprising a first neural network machine learning system, to identify characteristics within the received one time password data and generate a password signature for the user based on the received one time password data associated with the user wherein the password signature comprises a collection of digital or character code associated with the identified characteristics within the received one time password data;
identify a first set of authentication verification matching requirements based on the first application;
determine a first user authentication value based on a comparison of the generated password signature for the user and the identified first set of authentication verification matching requirements based on the first application; determine whether the first user authentication value meets a predetermined threshold value associated with the first application;
in response to determining that the first user authentication value meets the predetermined threshold value associated with the first application, authenticate the user, or
in response to determining that the first user authentication value does not meet the predetermined threshold value associated with the first application, do not authenticate the user or prompt the user for additional authentication credentials;
receive an authentication request for a second application from the user;
identify a second set of authentication verification matching requirements based on the second application, wherein the second application is associated with different security parameters from the first application;
determine a second user authentication value based on a comparison of the generated password signature for the user and the identified second authentication verification matching requirements for the received second authentication request;
determine whether the second user authentication value meets a predetermined threshold value associated with the second application; and in response to determining that the second user authentication value meets the predetermined threshold value associated with the second application, authenticate the user for the second application, or
in response to determining that the second user authentication value does not meet the predetermined threshold value associated with the second application, do not authenticate the user for the second application or prompt the user for additional authentication credentials.

2. The system of claim 1, wherein the one or more processing devices further execute the computer-readable program code to:
determine, using the first neural network machine learning system, that a set of individual capabilities of the first application or the second application are associated with malfeasance when accessed via any one time password authentication system; and
restrict, disable, or delay the set of individual capabilities of the first application or the second application.

3. The system of claim 1, wherein the second user authentication value does not meet the predetermined threshold value for the second application, and wherein the one or more processing devices further execute the computer-readable program code to:
determine that alternative characteristics of the user are required to authenticate the user for the second application;
cause a user interface of a computing device of the user to prompt the user to provide a new one time password for the user based on the alternative characteristics of the user;
receive, from the computing device of the user, new one time password data associated with the user;
cause the one time password signature generation engine, comprising the first neural network machine learning system, to identify the new characteristics within the received new one time password data and generate a new password signature for the user based on the received new one time password data associated with the user;
determine a third user authentication value based on a comparison of the generated new password signature for the user and the identified second authentication verification matching requirements for the received second authentication request determine whether the third user authentication value meets the predetermined threshold value associated with the second application; and
in response to determining that the third user authentication value meets the predetermined threshold value associated with the second application, authenticate the user for the second application, or
in response to determining that the third user authentication value does not meet the predetermined threshold value associated with the second application, do not authenticate the user for the second application.

4. The system of claim 1, wherein the first set of authentication verification matching requirements based on the second application comprises at least one authentication verification matching requirement associated with a characteristic that is not included in the first set of authentication verification matching requirements based on the first application.

5. The system of claim 1, wherein the first set of authentication verification matching requirements based on the second application comprises at least one authentication verification matching requirement associated with a weighting value of a particular characteristic that is different from the first set of authentication verification matching requirements based on the first application.

6. The system of claim 1, wherein a second neural network machine learning system analyzes one or more of computing device information, location information, authentication activity trends for a plurality of users that includes the user, and authentication activity trends for the user to determine the first set of authentication verification matching requirements based on the first application and the second set of authentication verification matching requirements based on the second application.

7. The system of claim 1, wherein a second neural network machine learning system analyzes one or more of historical one time password information, historical malfeasance information, and historical information for each of a plurality of users to determine the first set of authentication verification matching requirements based on the first application and the second set of authentication verification matching requirements based on the second application.

8. The system of claim 1, wherein a one time password prompt for the user is determined and generated by analyzing, using a second neural network machine learning system, historical one time password information, historical malfeasance information, and historical information for each of a plurality of users to determine a set of available one time passwords, wherein the set of available one time passwords comprises one time passwords of multiple password modalities, multiple password request types, and multiple password acquisition modalities.

9. A computer program product for security analysis and authentication across downstream applications, the computer program product comprising at least one non-transitory computer readable medium comprising computer readable instructions, the instructions comprising instructions for:
receiving one time password data associated with a user for an authentication request of a first application;
causing a one time password signature generation engine, comprising a first neural network machine learning system, to identify characteristics within the received one time password data and generate a password signature for the user based on the received one time password data associated with the user wherein the password signature comprises a collection of digital or character code associated with the identified characteristics within the received one time password data;
identifying a first set of authentication verification matching requirements based on the first application;
determining a first user authentication value based on a comparison of the generated password signature for the user and the identified first set of authentication verification matching requirements based on the first application;
determining whether the first user authentication value meets a predetermined threshold value associated with the first application;
in response to determining that the first user authentication value meets the predetermined threshold value associated with the first application, authenticating the user, or
in response to determining that the first user authentication value does not meet the predetermined threshold value associated with the first application, not authenticating the user or prompt the user for additional authentication credentials;
receiving an authentication request for a second application from the user;
identifying a second set of authentication verification matching requirements based on the second application, wherein the second application is associated with different security parameters from the first application;
determining a second user authentication value based on a comparison of the generated password signature for the user and the identified second authentication verification matching requirements for the received second authentication request;
determining whether the second user authentication value meets a predetermined threshold value associated with the second application; and
in response to determining that the second user authentication value meets the predetermined threshold value associated with the second application, authenticate the user for the second application, or
in response to determining that the second user authentication value does not meet the predetermined threshold value associated with the second application, not authenticating the user for the second application or prompt the user for additional authentication credentials.

10. The computer program product of claim 9, wherein the computer readable instructions further comprise instructions for:
determining, using the first neural network machine learning system, that a set of individual capabilities of the first application or the second application are associated with malfeasance when accessed via any one time password authentication system; and
restricting, disable, or delay the set of individual capabilities of the first application or the second application.

11. The computer program product of claim 9, wherein the second user authentication value does not meet the predetermined threshold value for the second application, and wherein the computer readable instructions further comprise instructions for:
determining that alternative characteristics of the user are required to authenticate the user for the second application;
causing a user interface of a computing device of the user to prompt the user to provide a new one time password for the user based on the alternative characteristics of the user;
receiving, from the computing device of the user, new one time password data associated with the user;
causing the one time password signature generation engine, comprising the first neural network machine learning system, to identify the new characteristics within the received new one time password data and generate a new password signature for the user based on the received new one time password data associated with the user;
determining a third user authentication value based on a comparison of the generated new password signature for the user and the identified second authentication verification matching requirements for the received second authentication request determining whether the third user authentication value meets the predetermined threshold value associated with the second application; and in response to determining that the third user authentication value meets the predetermined threshold value associated with the second application, authenticating the user for the second application, or in response to determining that the third user authentication value does not meet the predetermined threshold value associated with the second application, not authenticating the user for the second application.

12. The computer program product of claim 9, wherein the first set of authentication verification matching requirements based on the second application comprises at least one authentication verification matching requirement associated with a characteristic that is not included in the fir set of authentication verification matching requirements based on the first application.

13. The computer program product of claim 9, wherein the first set of authentication verification matching requirements based on the second application comprises at least one authentication verification matching requirement associated with a weighting value of a particular characteristic that is different from the first set of authentication verification matching requirements based on the first application.

14. The computer program product of claim 9, wherein a second neural network machine learning system analyzes one or more of computing device information, location information, authentication activity trends for a plurality of users that includes the user, and authentication activity trends for the user to determine the first set of authentication verification matching requirements based on the first application and the second set of authentication verification matching requirements based on the second application.

15. The computer program product of claim 9, wherein a second neural network machine learning system analyzes one or more of historical one time password information, historical malfeasance information, and historical information for each of a plurality of users to determine the first set of authentication verification matching requirements based on the first application and the second set of authentication verification matching requirements based on the second application.

16. The computer program product of claim 9, wherein a one time password prompt for the user is determined and generated by analyzing, using a second neural network machine learning system, historical one time password information, historical malfeasance information, and historical information for each of a plurality of users to determine a set of available one time passwords, wherein the set of available one time passwords comprises one time passwords of multiple password modalities, multiple password request types, and multiple password acquisition modalities.

* * * * *